United States Patent [19]

Kumaki

[11] Patent Number: 4,992,718
[45] Date of Patent: Feb. 12, 1991

[54] ELECTRIC FLOOR CLEANER WITH A SOFT START FUNCTION

[75] Inventor: Nobuyoshi Kumaki, Omiya, Japan

[73] Assignee: Nihon Patent Electric Co., Ltd., Kitamoto, Japan

[21] Appl. No.: 405,250

[22] Filed: Sep. 11, 1989

[51] Int. Cl.$^5$ ............................................. H02P 1/26
[52] U.S. Cl. ................................. 318/768; 318/430; 318/781; 318/803; 318/809; 363/36; 363/49
[58] Field of Search ............... 318/727, 767, 768, 769, 318/781, 782, 803, 809, 430, 431, 778; 363/36, 59, 60, 61, 49

[56] References Cited

U.S. PATENT DOCUMENTS

| 3,733,543 | 5/1973 | Retting | 363/36 |
|---|---|---|---|
| 3,983,463 | 9/1976 | Nabae et al. | 318/803 |
| 4,315,305 | 2/1982 | Siemon | 318/809 X |
| 4,328,454 | 5/1982 | Okuyama et al. | 318/803 |
| 4,469,997 | 9/1984 | Curtiss et al. | 318/809 X |
| 4,482,031 | 11/1984 | Yoshida et al. | 318/803 X |
| 4,845,607 | 7/1989 | Nakao et al. | 363/61 X |

FOREIGN PATENT DOCUMENTS

| 2753722 | 6/1979 | Fed. Rep. of Germany | 363/36 |
|---|---|---|---|
| 56-148180 | 11/1981 | Japan | 363/36 |
| 59-10171 | 1/1984 | Japan | 363/36 |
| 59-17872 | 1/1984 | Japan | 363/36 |

Primary Examiner—Bentsu Ro
Attorney, Agent, or Firm—Armstrong, Nikaido, Marmelstein, Kubovcik, & Murray

[57] ABSTRACT

An electric floor cleaner is of the type arranged to drive a three-phase motor, whose rated voltage is substantially equal to a voltage obtained by voltage doubling and rectifying a single-phase commercial power line and then by converting a voltage doubled d.c. voltage into three-phase a.c. by an inverter. The voltage and frequency of the three-phase a.c. output from the inverter are controlled for a predetermined period of time after a power switch is put into a turned on state from a turned off state. It is therefore possible to reduce the starting current to a small value enabling the use of a larger rated output motor than a motor in a conventional system within an allowable current limit of a commercial power line.

6 Claims, 6 Drawing Sheets

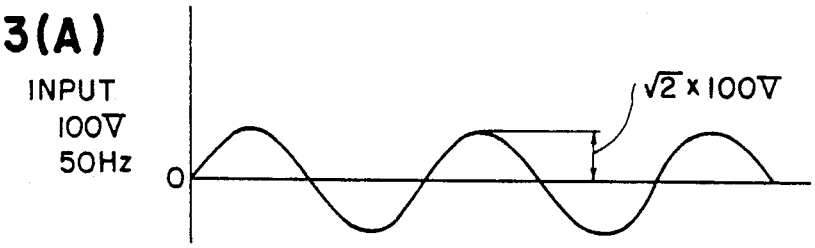
FIG.3(A) INPUT 100V 50Hz — √2 × 100V
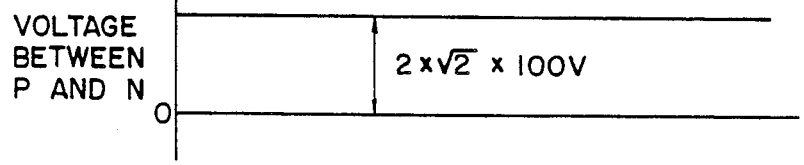
FIG.3(B) VOLTAGE BETWEEN P AND N — 2 × √2 × 100V
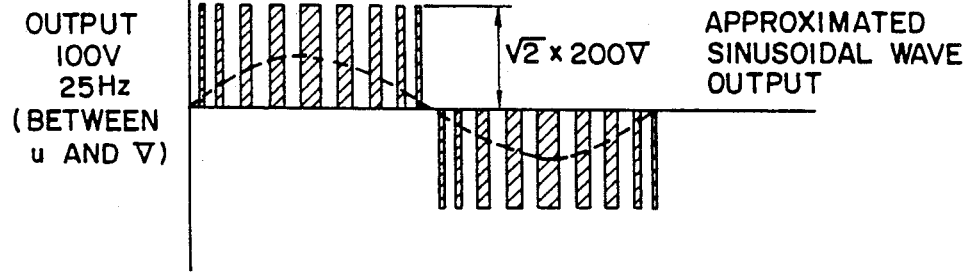
FIG.3(C) OUTPUT 100V 25Hz (BETWEEN u AND V) — √2 × 200V APPROXIMATED SINUSOIDAL WAVE OUTPUT
FIG. 4
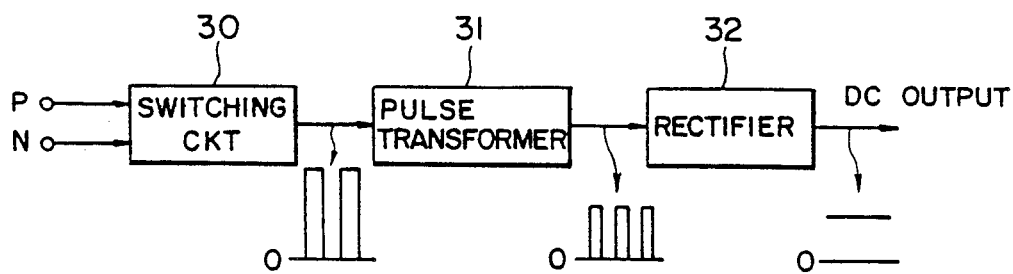

ELECTRIC FLOOR CLEANER WITH A SOFT START FUNCTION

BACKGROUND OF THE INVENTION

1. Field of the Invention

This invention generally relates to electric floor cleaners, and more particularly to an electric floor cleaner of the type having a three-phase a.c. motor driven by three-phase a.c. obtained by converting single phase a.c. from a single phase power source.

2. Description of the Prior Art

In conventional electric floor cleaners or polishers, there is a relationship between a brush-driving motor and power source voltage in theory as follows:

(a) A system in which a two-phase 100 volt driving motor is connected to an output side of an inverter whose input is 100 volt and output is 100 volt. This system is referred to as system A. In this specification, the words "inverter system" are used to mean a system which converts an a.c. input into a d.c. by way of a rectifier, and then the d.c. is converted into a desired a.c., and an inverter which simply converts a.c. to d.c. is referred to as "inverter".

(b) A system in which a three-phase 100 volt driving motor is connected to an output side of an inverter whose input is 100 volt and output is 100 volt. This system is referred to as system B.

(c) A system in which a single-phase 100 volt driving motor is operated through primary voltage control. This system is referred to as system C.

(d) A system in which a single-phase 100 volt driving motor is driven directly by commercial power source This system is referred to as system D.

(e) A system in which a d.c. driving motor is operated where commercial power is converted into d.c. by utilizing thyristors or the like. This system is referred to as system E.

(f) A system in which a three-phase 200 volt driving motor is connected to an output side of an inverter whose input is 200 volt and output is 200 volt where the inverter is connected to an output side of a transformer whose input is 100 volt and output is 200 volt. This system is referred to as system F.

The above mentioned conventional systems A to F have the following advantages and disadvantages.

SYSTEM A

(DISADVANTAGES)

Since the motor is of special type, the required frame is bulky.

Starting current is twice the normal operation current.

Cost is high.

SYSTEM B

(DISADVANTAGES)

The inverter system is bulky.

Transistors have control current which are large.

A standard motor is not available.

The size of the motor is large.

Cost is high.

SYSTEM C

(DISADVANTAGES)

The size of the motor is twice that of standard motors.

A feedback circuit and a TG (tachometer generator) are required.

A motor of a very special type is required.

The starting current is large.

Efficiency is very poor.

(ADVANTAGES)

The required controller is small in size.

SYSTEM D

(DISADVANTAGES)

The upper limit of the motor output within the allowable current limit, which will be described later, is low.

The degree of shock on starting is high.

There are considerable magnetic vibrations.

The starting current is large.

Variable speed is not available.

The size of the motor is twice that of a standard motor.

Efficiency is very poor.

(ADVANTAGES)

A standard motor and standard parts can be utilized.

Cost is low.

SYSTEM E

(DISADVANTAGES)

The maintenance of carbon brushes is troublesome.

The upper limit of the motor output is low.

The motor is large in size.

Cost is several times higher than other systems.

(ADVANTAGES)

The required controller is small in size.

SYSTEM F

(DISADVANTAGES)

A large-sized transformer is required.

(ADVANTAGES)

A standard inverter can be used.

Among the above described systems A to F, systems D and E are actually used.

Generally, the allowable current which can be taken from a single plug socket or convenience outlet of a commercial power line in a building is 20 amperes, and it is limited to disconnecting loads which require current more than the allowable current.

In recent years since computers or the like are often used in building, it is very important to avoid power supply cut-off resulting from excess demand above the allowable current. Therefore, careful attention must be used to avoid using a polisher where the current is above a given allowable value.

In the above mentioned systems D and E, it may be dangerous to use a driving motor of 0.75 kilowatt or more.

In systems using a single-phase motor as system D, strong electromagnetic vibrations are transmitted to the hands of an operator holding a polisher handle, and in the worst cases, operators often suffer from an occupational disease due to long time use of such a polisher.

In order to solve this problem, the present inventors invented, prior to the present invention, an electric floor cleaner having a three-phase 200 volt driving motor which is driven by three-phase 200 volt a.c. obtained by an inverter system connected to a single-phase 100 volt power source. This electric floor cleaner is capable of increasing the upper limit of a motor's output without exceeding the allowable current limit and is also capable of reducing the occurrence of occupational diseases and undesirable influences both caused from electromagnetic vibrations. More specifically, this novel electric floor cleaner according to the prior invention is of a driving method in which a three-phase 200 volt driving motor is connected to an output side of an inverter system with an input of a single-phase 100 volt and an output of three-phase 200 volt.

However, even if a three-phase motor is driven by producing three-phase 200 to 240 volt power using an inverter system having a voltage doubler rectifier connected to a commercial power source of 100 volts to 120 volts, and an inverter, it was only possible to increase motor output as high as 1.0 kilowatt within allowable current of a single plug socket of a single-phase commercial power source line because of the influence of starting current which flows on the motor starting.

SUMMARY OF THE INVENTION

Thus, the present invention is an improvement of the above-described conventional electric floor cleaner of three-phase motor driving system. It is therefore an object of the present invention to provide a new and useful electric floor cleaner which is capable of increasing motor output within an allowable current limit of a single-phase commercial power source line.

A further object of the present invention is to provide an electrical floor cleaner whose starting current is minimum while the size is small and efficiency and power factor are the best when comparing with the above-mentioned systems A to F.

A still further object of the present invention is to provide an electrical floor cleaner which emits less vibrations, whose cost is low, and which can be manufactured by using a standard motor and standard parts.

To achieve the above objects the present invention provides:

an electrical floor cleaner comprising:

(a) a device for voltage doubling and rectifying a single-phase commercial power source voltage fed through a power switch;

(b) an inverter for converting a voltage doubled d.c. obtained by the voltage doubling and rectifying device into three-phase a.c.;

(c) a device for controlling timing of conduction of switching elements of the inverter so as to control voltage and frequency of the three-phase a.c. for a predetermined period of time after the power switch is put into an on state from an off state;

(d) a three-phase motor arranged to be driven by the three-phase a.c. applied from the inverter, the three-phase motor having a rated voltage which is substantially equal to the doubled voltage; and (e) a floor cleaning member arranged to be driven by the three-phase motor.

BRIEF DESCRIPTION OF THE DRAWINGS

The object and features of the present invention will become more readily apparent from the following detailed description taken in conjunction with the accompanying drawings in which:

FIG. 3 is a waveform diagram for describing the operation of the block diagram of FIG. 2;

FIG. 4 is a block diagram showing the structure of a control power source circuit shown in FIG. 2;

The same or corresponding elements or parts are designated at like reference numerals throughout the drawings.

DETAILED DESCRIPTION OF THE PREFERRED EMBODIMENT

Figure 1:
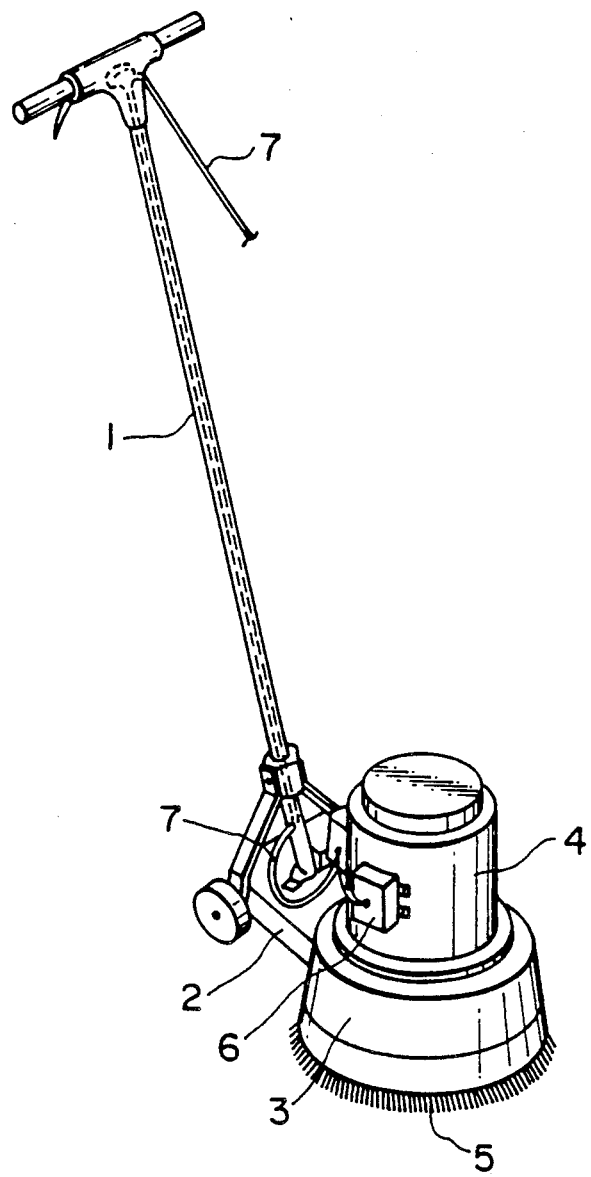
FIG. 1 is a perspective view of the electric floor cleaner according to the present invention.

Referring to the drawings a preferred embodiment of the electric floor cleaner of the present invention will be described hereinbelow.

FIG. 1 illustrates a perspective view of an embodiment of the present invention.

In the illustrated embodiment, a supporting truck 2 is attached to a tip portion of a handle shaft 1, and a cover 3 is attached to a front end of the supporting truck 2. On the upper center portion of the cover 3, is mounted a general purpose three-phase 200 volt motor 4. Below the cover 3, a rotary brush 5 is detachably attached. A gear box (not shown) for transmitting the rotational force of the three-phase 200 volt motor to the rotary brush 5 is mounted in the cover 3, and a single-phase power source inverter system 6 having a manipulation panel for converting single-phase 100 volts to three-phase 200 volts is fixed to the peripheral wall of the motor 4. The above-mentioned three-phase 200 volt motor 4 is supplied with power via the single-phase power source inverter system 6 from single-phase 100 volt commercial power source cable 7.

The present invention may be implemented as having vacuum suction function, detergent spraying function, and in such a case, a motor used for vacuum suction or spraying may also be supplied with power via the single-phase power source inverter. Furthermore, a secondary high-resistance special squirrel-cage stepless speed-change induction motor which is generally called a VC motor may be used as the three phase 200 volt motor.

Figure 2:
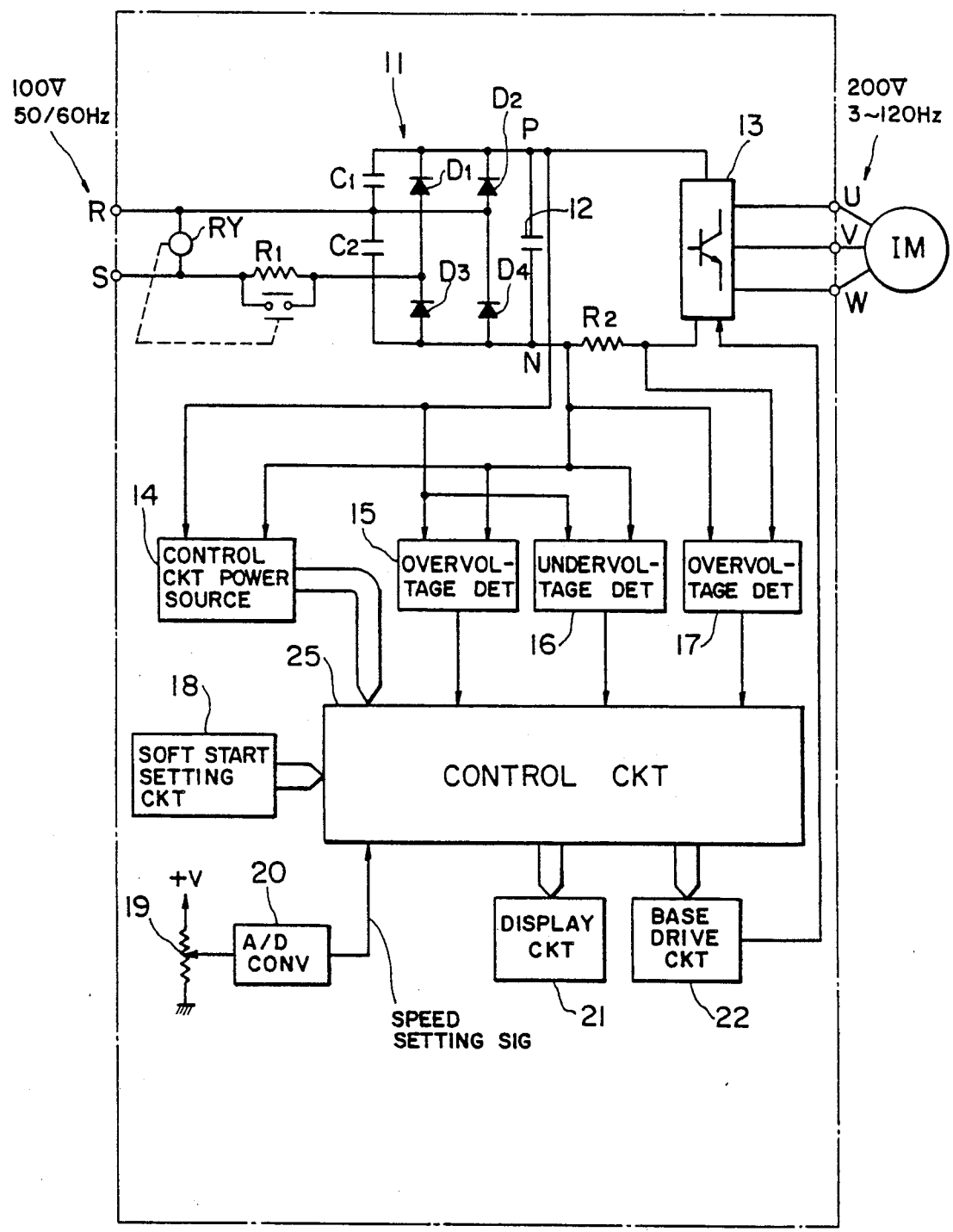
FIG. 2 is a block diagram showing an electrical circuit of the electric floor cleaner according to the present invention.

In this embodiment, although it is assumed that the voltage of a commercial single-phase power source is 100 volts and the rated voltage of the three-phase motor 4 is 200 volts, if the voltage of a commercial power source is different from 100 volts, for instance in the case of 120 volts, the rated voltage of the three-phase motor 4 is then 240 volt which is twice the rated line voltage. The single-phase power source inverter system 6 has a structure as shown in the block diagram of FIG. 2. A single-phase 100 volt a.c. is input through terminals R and S to be converted into d.c. power of 200 volts by way of a voltage doubling and rectifying circuit 11. The d.c. power is smoothed by a smoothing capacitor 12, and is converted into an a.c. power of 200 volts by an inverter 13 to output three-phase a.c. of 200 volts through terminals u, v and w. In the drawing, references $C_1$ and $C_2$ are smoothing capacitors for the voltage doubling and rectifying circuit 11, the references $D_1$ and $D_2$ are rectifier diodes, and the references $D_3$ and $D_4$ are flywheel diodes. The reference R2 is a current-detecting resistor; the reference IM is a three-phase induction motor whose rated voltage is 200 volts. A control circuit power source 14; an overvoltage detecting circuit 15; an undervoltage detecting circuit 16; an overcurrent detecting circuit 17; a soft start setting circuit 18 is provided. A manually operable potentiometer 19 connected between a d.c. voltage +V and ground. An A/D converter 20, a display circuit 21; a base drive circuit 22; and an abnormal output signal circuit 25 are also provided.

FIG. 3 shows waveforms of input and output voltages of the inverter system, and more specifically, it is illustrated how an input of single-phase 100 volts, 50 Hz is converted into an output of three-phase 200 volts, 25 Hz. Conduction timings of transistors which are switching elements of the inverter 13 are controlled by the base drive circuit 22 to obtain an approximate sinusoidal wave shown in FIG. 3. The output voltage and frequency can be controlled as will be described later.

The control circuit 25 receives respective detection signals from the overvoltage detecting circuit 15, undervoltage detecting circuit 16, overcurrent detecting circuit 17, a soft start setting signal from the soft start setting circuit 18, a speed setting signal from the A/D converter 20 to feed the base drive circuit 22 with a control signal through a given computation. This control circuit 25 comprises a general-purpose microprocessor (CPU), ROMs, RAMs, interfaces and so on.

The control circuit power source 14 supplies the control circuit 25 with given d.c. power voltage, and as shown in FIG. 4 a d.c. voltage between both terminals (P-N terminals) of the capacitor 12 is input into a switching circuit 30 to form a pulse waveform, and then voltage regualtion is performed by a pulse transformer 31 to obtain a d.c. output of a given voltage by a rectifier 32.

Figure 5:
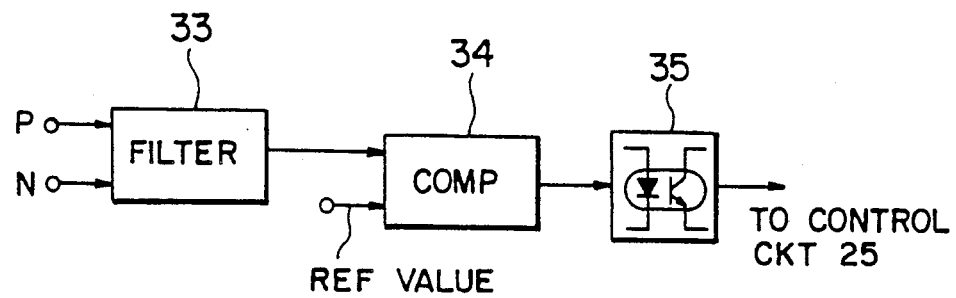
FIG. 5 is a block diagram showing the structure of an over voltage detecting circuit shown in FIG. 2.

The overvoltage detecting circuit 15 whose block diagram is shown in FIG. 5, compares a d.c. voltage between both terminals (P-N terminals) of the capacitor 12 with a reference value using a comparator 34, and is arranged to output an H or L level signal obtained through this comparison via a photocoupler 35. In FIG. 5, a filter 33 is a LPF for removing ripple components.

Since the undervoltage detecting circuit 16 and the overcurrent detecting circuit 17 have substantially the same structure as the overvoltage detecting circuit 15, illustration of these circuits is omitted.

Figure 6:
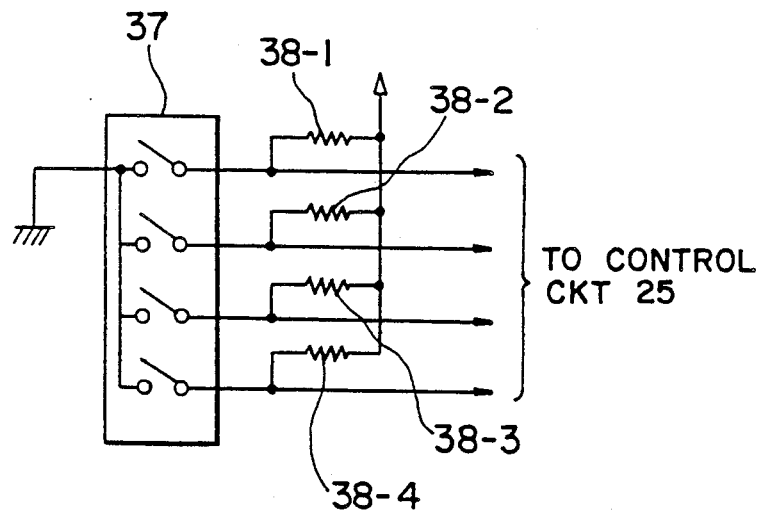
FIG. 6 is a block diagram showing the structure of a soft start setting circuit shown in FIG. 2.

The soft start setting circuit 18 whose structure is shown in FIG. 6 comprises a dip switch 37 having four circuits, and four resistors 38-1 to 38-4, and is arranged to send 4-bit data set in advance to the control circuit 25. The function of this soft start setting circuit 18 will be described in connection with a flowchart of a CPU which will be described later.

The display circuit 21 comprises, for instance, a lamp and its drive circuit for informing a user of an abnormal state by repeatedly flashing the lamp on an abnormal state such as the increase of the load of the motor IM.

The base drive circuit 22 is arranged to control the timing of turning on and turning off the power transistors in the inverter 13 on the basis of determined results, and the structure of this base drive circuit 22 may be the same as a general base drive circuit conventionally used.

Figure 7:
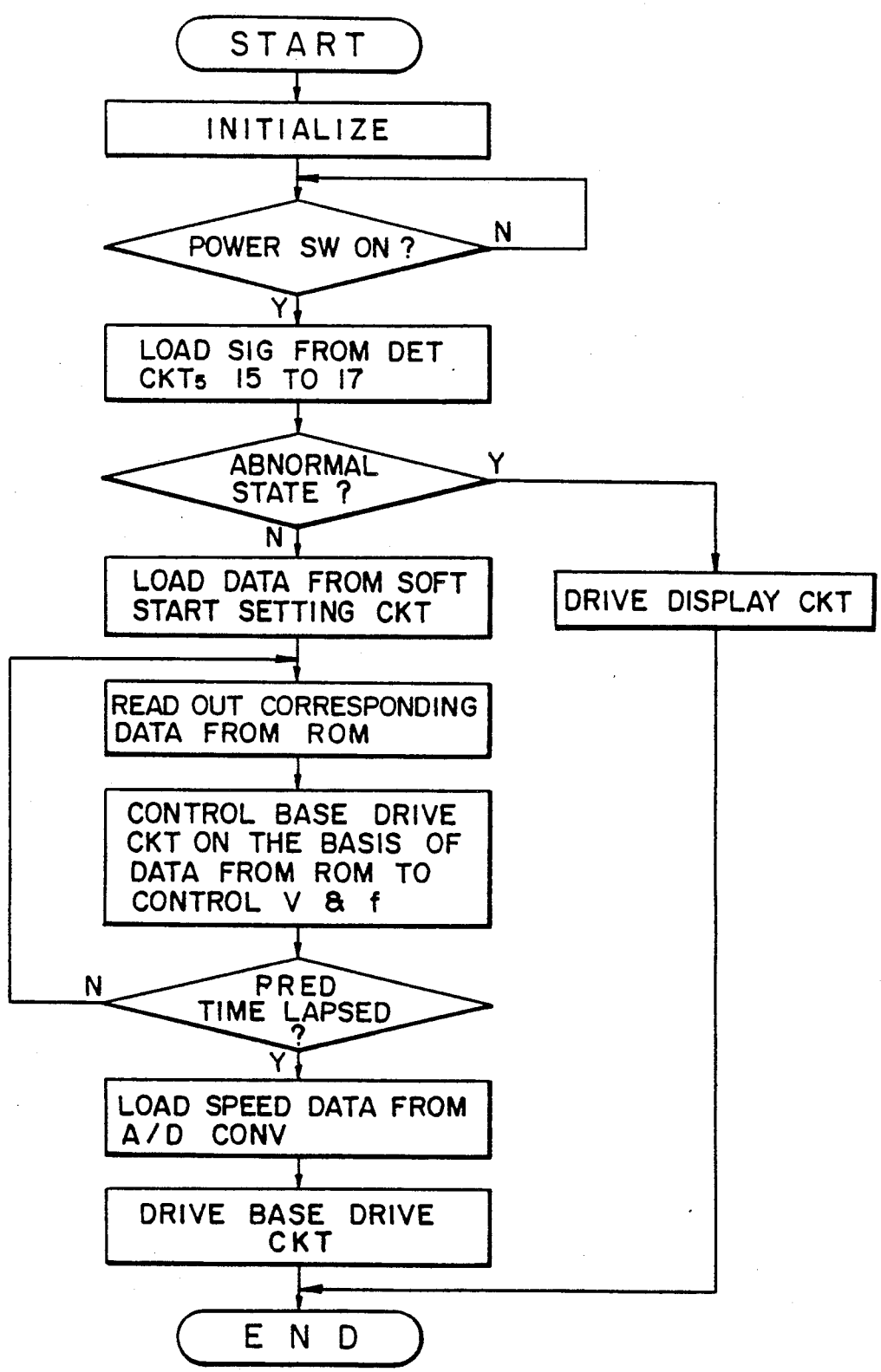
FIG. 7 is a flowchart showing the operation of a CPU in a control circuit shown in FIG. 2.

FIG. 7 is a flowchart showing the operational flow of the CPU which is a main element of the control circuit 25. As is clear from FIG. 7, when any one of the detection signals from the circuits 15 to 17 indicates an abnormal state, the display circuit 21 is driven to inform a user of an abnormal state by flashing the lamp or by other methods.

When an abnormal state is not present, 4-bit data from the soft start setting circuit 18 input is, and an address of a ROM within the control circuit 25 is designated by this 4-bit data to read out corresponding data from the ROM. This data is used for determining frequency and voltage of the three-phase power to be fed to the motor IM, and is used for controlling the inverter 13 through the base drive circuit 22.

A next step is for determining whether a predetermined period of time has lapsed or not after an unshown power switch is turned on. More specifically, a starting current flows for this predetermined period of time after the power switch is turned on, and therefore, the voltage (V) and the frequency (f) of the three-phase power to be applied to the motor IM are controlled on the basis of the data read out of the ROM. For this period, the control of the stating current is performed irrespective of a speed set by the manually operable potentiometer 19.

Figure 8:
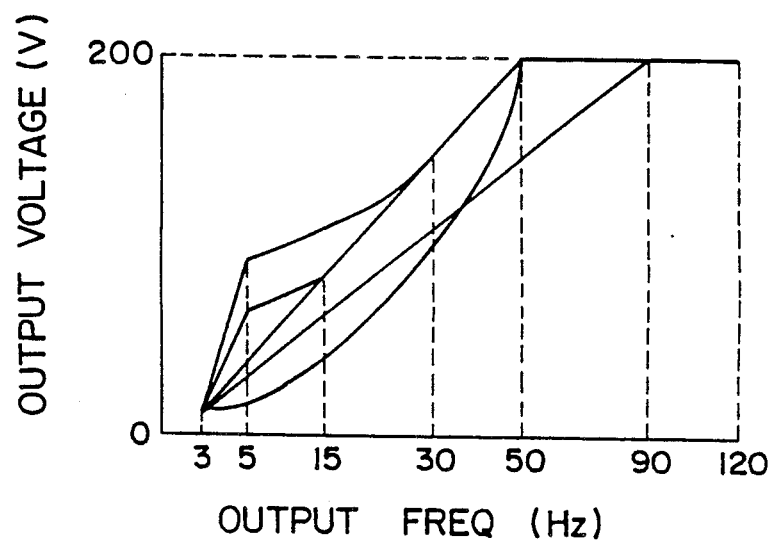
FIG. 8 is a diagram showing patterns giving the relationship between frequencies and voltages which can be selected by the soft start setting circuit.

FIG. 8 is a graph showing the relationship between the voltage (V) and frequency (f) of the output power from the inverter 13 on starting resulted from the soft start control. In this graph, five different curves are shown, and one of them is selected in advance by manipulating the dip switch 37 shown in FIG. 6. As shown in the drawing, it is possible to respectively change the frequency between several Hz and 120 Hz, and the voltage between 10 or more volt and a rated voltage.

Turning back to the flowchart of FIG. 7, after the above mentioned predetermined period of time has lapsed, the base drive circuit 22 is controlled in the same manner as in conventional circuits to control the inverter 13 so as to obtain a motor rotational speed set by the potentiometer 19.

From the foregoing detailed description of the invention, it will be understood that the the electric floor cleaner according to the present invention comprises a single-phase power source inverter system of single-phase 100 volt input and three-phase 200 volt output, a three-phase 200 volt motor connected to an output side of the single-phase inverter system, where the motor is used for driving a floor cleaning member, such as a rotary brush, and soft start means, thereby proving the following advantages:

(a) The electric floor cleaner can be manufactured at a low cost utilizing a standard motor and standard parts, such as an inverter.

(b) It is possible to safely use the driving motor up to approximately 1.3 kilowatt even if the above mentioned current limit of 20 A is present, and therefore, motor output can be increased.

(c) The size of the cleaner can be reduced to the minimum when compared with the aforementioned systems A to F.

(d) The efficiency and power factor are the best when compared with the aforementioned systems A to F, and therefore, the cleaner can contribute to improvement of power factor of transforming equipment or the like.

(e) Electromagnetic vibrations which give undesirable influences to an operator can be drastically reduced.

(f) The starting current can be reduced to the minimum when compared with the aforementioned systems A to F and the system disclosed the Japanese patent application provisional publication No. 61-249427.

The above described embodiment is just an example of the invention and therefore, it will be understood for those skilled in the art that various modifications and variations may be made without departing from the sprit of the invention.

What is claimed is:

1. An electrical floor cleaner comprising:
   voltage doubling and rectifying means for voltage doubling and rectifying a single-phase commercial power source voltage input through a power switch;
   an inverter for converting a doubled d.c. voltage from said voltage doubling and rectifying means into three-phase a.c.;
   control means for controlling voltage and frequency of said three-phase a.c. for switching elements of said inverter for a predetermined period of time after said power switch is put into an on state from an off state, said control means controlling said voltage and frequency according to a predetermined combination thereof, said voltage and frequency are different from rated values thereof, therein providing a soft start;
   a three-phase motor arranged to be driven by said three-phase a.c. applied from said inverter, said three-phase motor having a rated voltage which is substantially equal to the doubled voltage; and
   a floor cleaning member arranged to be driven by said three-phase motor.

2. An electrical floor cleaner as claimed in claim 1, wherein said control includes a manually operable dip switch having a plurality of circuits, and a memory means for storing a plurality of patterns of relationship between voltages and frequencies which are designated by said manually operable dip switch.

3. An electrical floor cleaner as claimed in claim 1, further comprising manually operable adjustable speed setting means, and means responsive to an output from said speed setting means for controlling conduction timings of switching elements of said inverter so that said motor rotates at a setting speed after said predetermined period of time has lapsed.

4. An electrical floor cleaner as claimed in claim 1, further comprising detecting means for detecting input voltage of said inverter and alarm means responsive to said detecting means for emitting an alarm.

5. An electrical floor cleaner as claimed in claim 1, further comprising detecting means for detecting input current of said inverter and alarm means responsive to said detecting means for emitting an alarm.

6. An electrical floor cleaner comprising:
   voltage doubling and rectifying means for voltage doubling and rectifying a single-phase commercial power source voltage input through a power switch;
   an inverter for converting a doubled d.c. voltage from said voltage doubling and rectifying means into three-phase a.c.;
   control means for controlling timing of conduction of switching elements of said inverter so as to control voltage and frequency of said three-phase a.c. for a predetermined period of time after said power switch is put into an on state from an off state, said control means including a manually operable dip switch having a plurality of circuits, and a memory means for storing a plurality of patterns of relationship between voltages and frequencies which are designated by said manually operable dip switch;
   a three-phase motor arranged to be driven by said three-phase a.c. applied from said inverter, said three-phase motor having a rated voltage which is substantially equal to the doubled voltage; and
   a floor cleaning member arranged to be driven by said three-phase motor.

* * * * *